UNITED STATES PATENT OFFICE 2,220,521

THIOCYANO ESTER

William F. Hester, Drexel Hill, Pa., assignor to Röhm & Haas Company, Philadelphia, Pa.

No Drawing. Application November 8, 1938, Serial No. 239,421

14 Claims. (Cl. 260—399)

This invention relates to a new class of organic compounds that are esters of glycols, one hydroxyl group of which is esterified with a monocarboxylic acid containing at least four carbon atoms and the other with thiocyanic acid.

It has heretofore been known that many organic thiocyano compounds, particularly those of the aliphatic series, are valuable ingredients in the preparation of insecticides. Many of the compounds that have been proposed for this purpose have an objectional odor and some, when used in sufficient quantities to be effective insecticides, cause irritation to eyes and mucous membranes of humans and animals. The compounds of the present invention are themselves valuable insecticides that are free of objectional odor and irritation and are also useful when mixed with other thiocyanates in reducing the danger of irritation. In addition they are valuable intermediates for the preparation of dyestuffs, special solvents, plasticizers, and surface-active materials.

The new esters are not readily obtainable by the direct esterification of a glycol with the monocarboxylic acid and thiocyanic acid but can easily prepared from a halogen derivative of a monoester of the monocarboxylic acid and the glycol by reacting the halogen derivative with a salt of thiocyanic acid. These halogen derivatives may be prepared in a variety of ways as, for instance, by esterifying one molecular equivalent of the glycol with one molecular equivalent of the monocarboxylic acid and treating the resulting monoester of the glycol with phosphorus trichloride, or it may be prepared by converting the monocarboxylic acid to the acyl halide by treatment with phosphorus trichloride and reacting the acyl halide with an alkylene oxide or alkylene halohydrine. Other alternative methods are to react the sodium salt of the monocarboxylic acid with an alkylene dihalide, and to esterify the monocarboxylic acid with a halohydrine. Whichever of these procedures is used, the resulting product is a halogen derivative of a monoester of a monocarboxylic acid and a glycol wherein one hydroxyl group of the glycol has been esterified with a monocarboxylic acid and the other replaced by a halogen.

The halogen atom of these compounds may be readily replaced by the thiocyano group by heating the halogen compound with excess anhydrous inorganic thiocyanate either in the presence or absence of an anhydrous solvent such as methyl isobutyl ketone at temperatures from about 100 to about 160° C. for approximately 24 hours. If desired, a catalyst for the reaction such as copper or sodium iodide may also be added. The reaction product may be purified by dissolving it in a water-insoluble organic solvent, washing this solution with water, drying, and if desired evaporating a part or all of the organic solvent. As most of the new compounds are rather high-boiling esters, they are not readily purified by distillation.

The monobasic carboxylic acids that may be used in the preparation of the new esters may be aliphatic, aromatic, arylaliphatic, cycloaliphatic, or heterocyclic. The aliphatic acid may be straight or branched chain, saturated or unsaturated and may be either lower or higher members of the series. For the preparation of insecticides aliphatic acids of from about 8 to 16 carbon atoms are preferred. The aromatic and arylaliphatic acids, as well as the cycloaliphatic, may have alkyl groups substituted in their ring.

Among the monocarboxylic acids that may be used are butyric, isobutyric, crotonic, α-ethyl butyric, capric, caprylic, lauric, α-ethyl hexoic, myristic, the naphthenic acids, benzoic, benzyloxybenzoic, salicylic, clupanodonic, chlorobenzoic, phenyl acetic, abietic, campholic, naphthyl acetic, tetrahydro naphthyl acetic, fluorobenzoic, oleic, linoleic, elaidic, ricinoleic, octyloxyacetic, caprylphenoxy acetic, cyclohexyloxyacetic acid, m-nitrobenzoic, benzoyl benzoic, acetoacetic, undecylenic, stearic, eleostearic, palmitic and such commercial fatty acid mixtures as cocoanut oil fatty acids, mixtures obtained by the oxidation of petroleum and those sold under the tradenames Talloils and Indusoil. The acids may contain inorganic substituents such as halogens and nitro groups but preferably are composed of the elements carbon, hydrogen, and oxygen.

The glycol nucleus of the new compounds may be derived from an alkylene glycol such as ethylene glycol, propylene glycol, butylene glycol, 1,10-decane diol, etc. or from polyalkylene glycols such as diethylene glycol, triethylene glycol, dibutylene glycol etc.

To illustrate the method by which the new glycol esters may be prepared the following examples are given, but it should be understood that the invention is not limited to the particular compounds nor to the specific methods of preparation that are described.

*Example 1*

A mixture of 224 g. of technical furoic acid and 402 g. of anhydrous ethylene chlorohydrine was refluxed for 24 hours. The excess chlorohydrine was distilled off under diminished pressure and then the product was distilled. As the distillate contained some free furoic acid, it was dissolved in an equal volume of benzene and extracted three times with half its volume of 10% sodium carbonate solution. The organic layer was washed with water, dried over calcium chloride and then distilled. The betachloroethyl furoate boiled at 155° C. at about 30 mm. pressure.

A mixture of 50 g. of this chloride, 28 g. of anhydrous sodium thiocyanate, 25 g. of methyl isobutyl ketone, 0.5 g. of sodium iodide and 0.5 g. of copper dust was stirred and heated at 120–124° C. for 25 hours. After the product was cooled, it was diluted with water and extracted with benzene. The organic layer was dried over calcium chloride, concentrated under diminished pressure on a water bath, and filtered. The β-thiocyano ethyl furoate obtained was a brown oil, 90% pure.

Example 2

A reaction mixture consisting of one mol of benzoic acid and five mols of ethylene chlorohydrine was heated at 115–120° C. and stirred for 24 hours. Excess ethylene chlorohydrine was removed by distillation at reduced pressure and the residue was washed with aqueous sodium carbonate to remove unreacted benzoic acid. The resulting brown oil was extracted with ether, and the solution was washed with water, dried over calcium chloride and concentrated. The oil distilled at 135–136° C. at 15 mm. pressure.

A mixture of 50 g. of betachloroethyl benzoate thus prepared, 26.5 g. of anhydrous sodium thiocyanate, 25 g. of methyl isobutyl ketone, 0.5 g. of sodium iodide and 0.5 g. of copper was stirred and heated at 110–120° C. for 24 hours. The product was diluted with water and extracted with ether, dried over calcium chloride, concentrated and filtered. After several purifications by precipitation from benzene solution by the addition of petroleum ether, the oil gave crystals melting at 41–43° C. Analysis showed the crystals to be 98% pure $C_6H_5CO_2C_2H_4SCN$.

Example 3

A mixture of 400 g. of technical lauric acid and 101 g. of phosphorus trichloride was allowed to stand at room temperature for 24 hours. The bottom layer of phosphorous acid was drawn off and to the top layer was added 197 g. of anhydrous ethylene chlorohydrine and this mixture again allowed to stand at room temperature for 24 hours. In place of the ethylene chlorohydrine, an equivalent amount of ethylene oxide can be used. The product was washed four times with one-fourth its volume of water and then dried over calcium chloride.

A mixture of 100 g. of this chloride and 42 g. of anhydrous sodium thiocyanate was heated at 130–144° C. for 25 hours. The product was cooled, mixed with water and extracted with benzene. The benzene extract was dried over calcium chloride, concentrated to 100 g. by evaporation of the solvent and then clarified with activated carbon. The product analyzed 84.5% thiocyano ethyl laurate.

Example 4

A solution of 2.5 kg. of technical cocoanut oil acid in 2 kg. of 98% ethylene chlorohydrine was gradually heated on an oil bath over a period of about three and one-half hours to a temperature of 220° C. during which the water of reaction and part of the chlorohydrine was removed by distillation. While continuing the distillation 1.5 kg. of ethylene chlorohydrine was added slowly over a period of about six and one-half hours below the surface of the reaction mixture. After all water of reaction and excess chlorohydrine were removed, the reaction product was distilled under reduced pressure. The fraction boiling between 125–198° C. at 1 mm. pressure was collected and amounted to an 81% yield of the chloroethyl ester of the cocoanut oil acids.

A mixture of 100 g. of this product, 52 g. of anhydrous potassium thiocyanate and 60 g. of methyl isobutyl ketone was stirred and heated at 135–139° C. for 25 hours. After the reaction product cooled, it was diluted with water and extracted with benzene. The benzene extract was washed with water, dried over calcium chloride and concentrated. The product was further purified by dissolving it in 400 cc. of petroleum ether, adding 7.5 g. of activated carbon, stirring the mixture at its boiling temperature, and then filtering off the carbon and evaporating the petroleum ether.

Example 5

A commercial mixture of fatty acids obtained from the oxidation of petroleum having an acid number 300 and a saponification number 339 was converted to the chloroethyl ester by the procedure of Example 2 and then fractionally distilled. One fraction, equalling about 40% of the whole, boiled between 130° C. and 156° C. at 18 mm. pressure. Another fraction, also equalling about 40% of the original, boiled between 110° C. and 125° C. at 3 mm. pressure. Each of these fractions was converted to the thiocyanate by the procedure of Example 2.

Example 6

A commercial sample of naphthenic acid, having a molecular weight of about 244, an acid number of 230 and distilling range of from 160° to 210° C. at 25 mm. pressure, was converted to the chloroethyl ester by slowly distilling excess chlorohydrine from a mixture of the two reagents. The reaction product was washed with water, then dried and converted to the thiocyanate by heating it, dissolved in methyl isobutyl ketone, with sodium thiocyanate in the presence of copper.

Example 7

To 123 g. of ground fused sodium isobutyrate 123 g. of β,β'-dichloro diethyl ether and 3.5 cc. of diethylamine were added and the mixture heated at 128–139° C. for 24 hours. The product was washed with water and distilled through a fractionating column. 155 g. of β-chloroethoxy ethyl isobutyrate were obtained.

To 100 g. of this chloride 55 g. of anhydrous sodium thiocyanate, 25 g. of methyl isobutyl ketone and 1 g. of powdered copper were added and the mixture heated at 99° C. for 24 hours. The product was mixed with water, then extracted with benzene and the benzene extract dried. To it another 55 g. of anhydrous sodium thiocyanate and 1 g. of powdered copper were added and the mixture again heated to 99° C. for 24 hours. The thiocyano ethoxy ethyl isobutyrate was isolated by washing with water and extracting with benzene.

Example 8

75 g. of the anhydrous sodium salt of cocoanut oil fatty acids were heated with 193 g. of β,β'-dichloro diethyl ether and 2 cc. of diethylamine for four hours at 145° C. The sodium chloride was separated from the reaction product by washing with water and the excess dichloro diethyl ether by distilling under reduced pressure.

To the residue 33 g. of anhydrous sodium thiocyanate, 100 g. of methyl isobutyl ketone and 1 g. of copper dust were added and the mixture heated at 124–127° C. for 20 hours. The product was isolated as in the preceding example and again heated to 124–127° C. for 20 hours with another 33 g. of sodium thiocyanate and 1 g. of copper dust added. As in the previous examples the thiocyanoethoxy ethyl ester of the cocoanut oil acids was freed of soluble salts by washing with water and purified by extracting with benzene.

In analogous ways any of the other monocarboxylic acids heretofore mentioned may be converted to the halogen derivative of monoglycol ester of any of the glycols heretofore mentioned and the halogen derivative then converted to the corresponding thiocyanate.

In contrast to the thiocyano glycol esters of carboxylic acids having less than four carbon atoms those of the class herein disclosed are much more soluble in the usual hydrocarbon solvents used in the preparation of insect sprays and, when dissolved in amounts of between ½ and 5% in highly refined kerosene, produce excellent non-irritating insect sprays that are free of objectional odor. The new esters may also be applied to a dry powder, such as talc, to produce an insecticidal dusting powder or they may be dissolved in a light oil and the oil emulsified in water to produce agricultural sprays. In these various ways of utilizing the new esters for insecticidal purposes they may be used as the sole toxic ingredients or they may be used in admixture with other toxic materials such as other organic thiocyanates, rotenone, derris extract, pyrethrum, nitro-substituted phenyl benzyl ethers, nitro-substituted diphenyl ethers, etc.

I claim:

1. An ester of a glycol in which one of the glycol hydroxyl groups is esterified with a monocarboxylic acid containing at least four carbon atoms and the other hydroxyl group is replaced by a thiocyanate radical.

2. An ester of a glycol in which one of the glycol hydroxyl groups is esterified with a monocarboxylic acid containing at least four carbon atoms and composed of the elements carbon, hydrogen, and oxygen and the other hydroxyl group is replaced by a thiocyanate radical.

3. An ester of a glycol in which one of the glycol hydroxyl groups is esterified with an aliphatic monocarboxylic acid containing from 8 to 16 carbon atoms and composed of the elements carbon, hydrogen, and oxygen and the other hydroxyl group is replaced by a thiocyanate radical.

4. An ester of a glycol in which one of the glycol hydroxyl groups is esterified with lauric acid and the other hydroxyl group is replaced by a thiocyanate radical.

5. An ester of a glycol in which one of the glycol hydroxyl groups is esterified with cocoanut oil fatty acids and the other hydroxyl group is replaced by a thiocyanate radical.

6. An ester of ethylene glycol in which one of the glycol hydroxyl groups is esterified with a monocarboxylic acid containing at least four carbon atoms and the other hydroxyl group is replaced by a thiocyanate radical.

7. An ester of ethylene glycol in which one of the glycol hydroxyl groups is esterified with an aliphatic monocarboxlic acid containing at least four carbon atoms and the other hydroxyl group is replaced by a thiocyanate radical.

8. An ester of ethylene glycol in which one of the glycol hydroxyl groups is esterified with an aliphatic monocarboxylic acid containing from 8 to 16 carbon atoms and composed of the elements carbon, hydrogen, and oxygen and the other hydroxyl group is replaced by a thiocyanate radical.

9. An ester of ethylene glycol in which one of the glycol hydroxyl groups is esterified with lauric acid and the other hydroxyl group is replaced by a thiocyanate radical.

10. An ester of ethylene glycol in which one of the glycol hydroxyl groups is esterified with cocoanut oil fatty acids and the other hydroxyl group is replaced by a thiocyanate radical.

11. An ester of diethylene glycol in which one of the glycol hydroxyl groups is esterified with a monocarboxylic acid containing at least four carbon atoms and the other hydroxyl group is replaced by a thiocyanate radical.

12. An ester of diethylene glycol in which one of the glycol hydroxyl groups is esterified with an aliphatic monocarboxylic acid containing at least four carbon atoms and the other hydroxyl group is replaced by a thiocyanate radical.

13. An ester of diethylene glycol in which one of the glycol hydroxyl groups is esterified with cocoanut oil fatty acids and the other hydroxyl group is replaced by a thiocyanate radical.

14. An insecticide comprising as a toxic ingredient an ester of a glycol in which one of the glycol hydroxyl groups is esterified with a monocarboxylic acid containing at least four carbon atoms and the other hydroxyl group is replaced by a thiocyanate radical.

WILLIAM F. HESTER.